United States Patent
Yoo et al.

(10) Patent No.: US 9,313,050 B2
(45) Date of Patent: Apr. 12, 2016

(54) METHOD AND GATEWAY FOR EXTENDING ETHERCAT NETWORK

(71) Applicant: Foundation of Soongsil University-Industry Cooperation, Seoul (KR)

(72) Inventors: Myungsik Yoo, Seoul (KR); Sang Yoon Lee, Gyeonggi-Do (KR); Won Hee Lee, Seoul (KR)

(73) Assignee: Foundation of Soongsil University Industry Cooperation, Seoul (KR)

( * ) Notice: Subject to any disclaimer, the term of this patent is extended or adjusted under 35 U.S.C. 154(b) by 111 days.

(21) Appl. No.: 14/472,951

(22) Filed: Aug. 29, 2014

(65) Prior Publication Data
US 2015/0063167 A1  Mar. 5, 2015

(30) Foreign Application Priority Data
Aug. 30, 2013 (KR) .................... 10-2013-0103612

(51) Int. Cl.
| | |
|---|---|
| H04J 3/16 | (2006.01) |
| H04L 12/66 | (2006.01) |
| H04L 29/06 | (2006.01) |
| H04L 12/46 | (2006.01) |
| H04W 88/16 | (2009.01) |
| H04L 12/28 | (2006.01) |

(52) U.S. Cl.
CPC ............ *H04L 12/66* (2013.01); *H04L 12/4625* (2013.01); *H04L 69/08* (2013.01); *H04L 2012/2841* (2013.01); *H04W 88/16* (2013.01)

(58) Field of Classification Search
USPC ........................................ 370/412, 401, 466
See application file for complete search history.

(56) References Cited

U.S. PATENT DOCUMENTS

| | | | | |
|---|---|---|---|---|
| 2010/0241773 A1* | 9/2010 | Rostan | ................. | H04L 12/403 710/110 |
| 2014/0188933 A1* | 7/2014 | Chomik | ................ | H04L 67/125 707/770 |
| 2015/0172220 A1* | 6/2015 | Rahamim | ............. | H04L 12/437 370/389 |

\* cited by examiner

*Primary Examiner* — Duc C Ho
(74) *Attorney, Agent, or Firm* — Mintz Levin Cohn Ferris Glovsky and Popeo, P.C.

(57) ABSTRACT

A method and a gateway for extending a network are disclosed. A method by which a gateway extends an EtherCAT network to a wireless network according to an embodiment of the invention includes: receiving first data from the EtherCAT network and converting the first data by a protocol conversion to second data suitable for the wireless network, and transmitting the converted second data to the wireless network, where the transmitting of the converted second data may include reducing the difference in communication speed between the EtherCAT network and the wireless network by using an internal buffer.

6 Claims, 4 Drawing Sheets

METHOD AND GATEWAY FOR EXTENDING ETHERCAT NETWORK

CROSS-REFERENCE TO RELATED APPLICATIONS

This application claims the benefit of Korean Patent Application No. 10-2013-0103612, filed with the Korean Intellectual Property Office on Aug. 30, 2013, the disclosure of which is incorporated herein by reference in its entirety.

TECHNICAL BACKGROUND

The present invention relates to a method and a gateway for extending an EtherCAT network, more particularly to a method and a gateway for extending an EtherCAT network to a wireless network.

RELATED ART

EtherCAT, developed by Beckhoff Automation of Germany, is a fieldbus system based on EtherNet and is defined in IEC (International Electro-technical Commission) 61158.

A conventional fieldbus is difficult to extend to the I/O level, and since the communication speed, physical layer, and hardware of each fieldbus is different, there may be problems in extending, maintaining or repairing existing systems.

EtherCAT, which was proposed to overcome such problems, is operated based on a master-slave scheme similar to a conventional fieldbus, and can employ EtherNet cables as is. Thus, EtherCAT makes it possible to integrate upper level systems to lower level systems more easily and with less cost compared to a conventional fieldbus, as well as to provide very high speeds (256 Digital I/O Input: 11 µs, 200 Analog I/O (16 bit): 50 µs) and support various topologies.

However, although the EtherCAT fieldbus technology described above may show superior performance in a wired environment, there may be space constraints caused by the use of cables and problems in simplifying the device controller, etc., and as such, there is a need for extending the EtherCAT network to wireless networks.

SUMMARY

To resolve the problems in the related art described above, an aspect of the invention aims to extend the EtherCAT network to wireless networks.

To achieve the above objective, an embodiment of the invention provides a method by which a gateway extends an EtherCAT network to a wireless network. The method includes: receiving first data from the EtherCAT network and converting the first data by a protocol conversion to second data suitable for the wireless network, and transmitting the converted second data to the wireless network, where the transmitting of the converted second data may include reducing the difference in communication speed between the EtherCAT network and the wireless network by using an internal buffer.

In an embodiment of the invention, converting the first data to the second data may include fragmenting the first data.

Also, in an embodiment of the invention, the method of extending the network may further include receiving third data from the wireless network and converting the third data by a protocol conversion to fourth data suitable for the EtherCAT network, and transmitting the converted fourth data to the EtherCAT network, where transmitting the converted fourth data may include reducing the difference in communication speed between the EtherCAT network and the wireless network by using an internal buffer.

To achieve the objective above, an embodiment of the invention provides a gateway for extending an EtherCAT network to a wireless network. The gateway includes: a protocol conversion unit configured to convert first data, which is received from the EtherCAT network, by a protocol conversion to second data suitable for the wireless network, and a data transmission unit configured to transmit the converted second data to the wireless network, where the data transmission unit may reduce the difference in communication speed between the EtherCAT network and the wireless network by using an internal buffer.

In an embodiment of the invention, the protocol conversion unit may convert the first data to the second data by fragmenting the first data.

Also, in an embodiment of the invention, the protocol conversion unit may convert third data, which is received from the wireless network, by a protocol conversion to fourth data suitable for the EtherCAT network, and the data transmission unit may transmit the converted fourth data to the EtherCAT network.

According to an embodiment of the invention, an EtherCAT network can be extended to a wireless network.

Also, the problems that may otherwise occur in a wired environment when applying EtherCAT fieldbus technology, such as space constraints caused by the use of cables and problems in simplifying the device controller, etc., can be resolved.

Additional aspects and advantages of the present invention will be set forth in part in the description which follows, and in part will be obvious from the description, or may be learned by practice of the invention.

DETAILED DESCRIPTION

Figure 1:
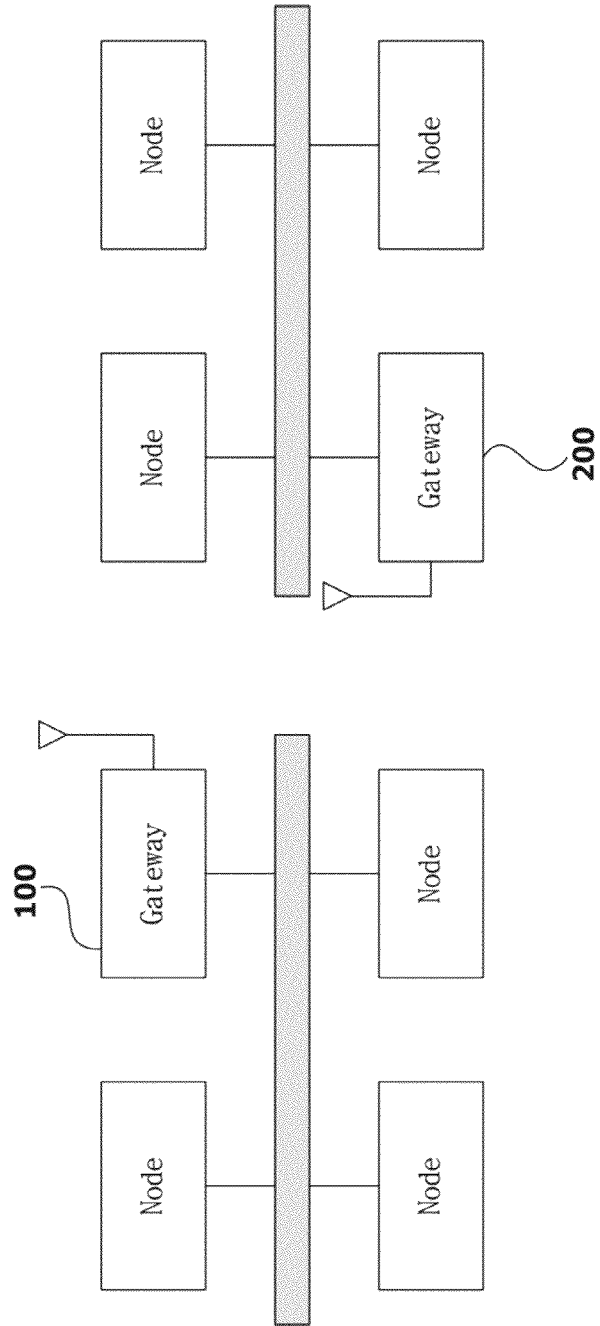
FIG. 1 illustrates a structure for extending an EtherCAT network according to an embodiment of the invention.

The present invention will be described below with reference to the accompanying drawings. However, the invention can be implemented in various different forms and are not to be limited to the embodiments described herein.

In order to clearly describe the invention, the drawings may have certain parts omitted if they have little bearing with the descriptions. Throughout the specification, like reference numerals are used for like parts.

Throughout the specification, reference to a certain part being "connected" to another part is intended to mean not only being "directly connected" but also being "indirectly connected" with other elements positioned in-between.

Also, when a part is referred to as "including" a component, this is intended to mean that other additional components may exist and is not intended to exclude other components unless specifically indicated otherwise.

An embodiment of the present invention is described below in more detail with reference to the accompanying drawings.

FIG. 1 illustrates a structure for extending an EtherCAT network according to an embodiment of the invention.

A gateway 100, 200 based on an embodiment of the invention can be added as a wired or wireless network to an existing wired fieldbus network.

The gateways 100, 200 based on an embodiment of the invention can operate as coupling devices, as illustrated in FIG. 1, to connect wired/wireless networks that use different OSI layers.

Here, an EtherCAT network can use the IEEE 802.3 standard, while a wireless network can use the IEEE 802.15.4 standard.

Figure 2:
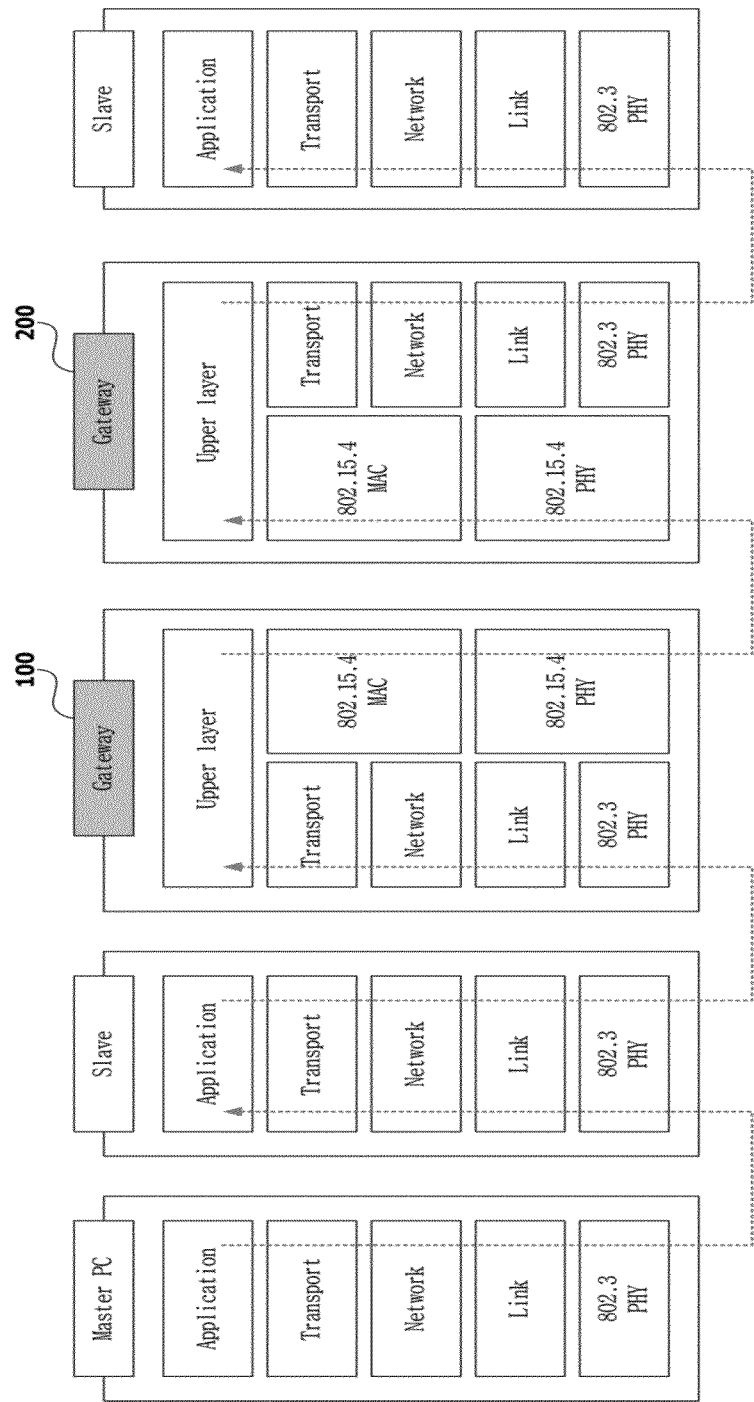
FIG. 2 is a flow diagram for an EtherCAT network extension protocol according to an embodiment of the invention.

FIG. 2 is a flow diagram for an EtherCAT network extension protocol according to an embodiment of the invention.

The EtherCAT network can be composed of a master and a slave. In order to implement a wireless extension between slaves or between the master and a slave of the EtherCAT network, a gateway 100, 200 based on an embodiment of the invention can convert the protocol of the EtherCAT network into the protocol of the wireless network or convert the protocol of the wireless network into the protocol of the EtherCAT network.

That is, the gateway 100, 200 may serve to suitably convert the data transmitted from the data link layer of the EtherCAT network and transmit it to the application layer, and convert the data transmitted from the application layer by a protocol conversion such that it is suitable for each network and transmit it to the data link layer, thus performing the role of a coupling device in the network.

Here, the gateway 100, 200 can fragment the data of the EtherCAT network to resolve problems resulting from the difference in data frame sizes between different networks and can use an internal buffer to overcome the difference in communication speed between IEEE 802.3, the transmission scheme used by EtherCAT networks, and IEEE 802.15.4, the transmission scheme used by wireless networks.

Figure 3:
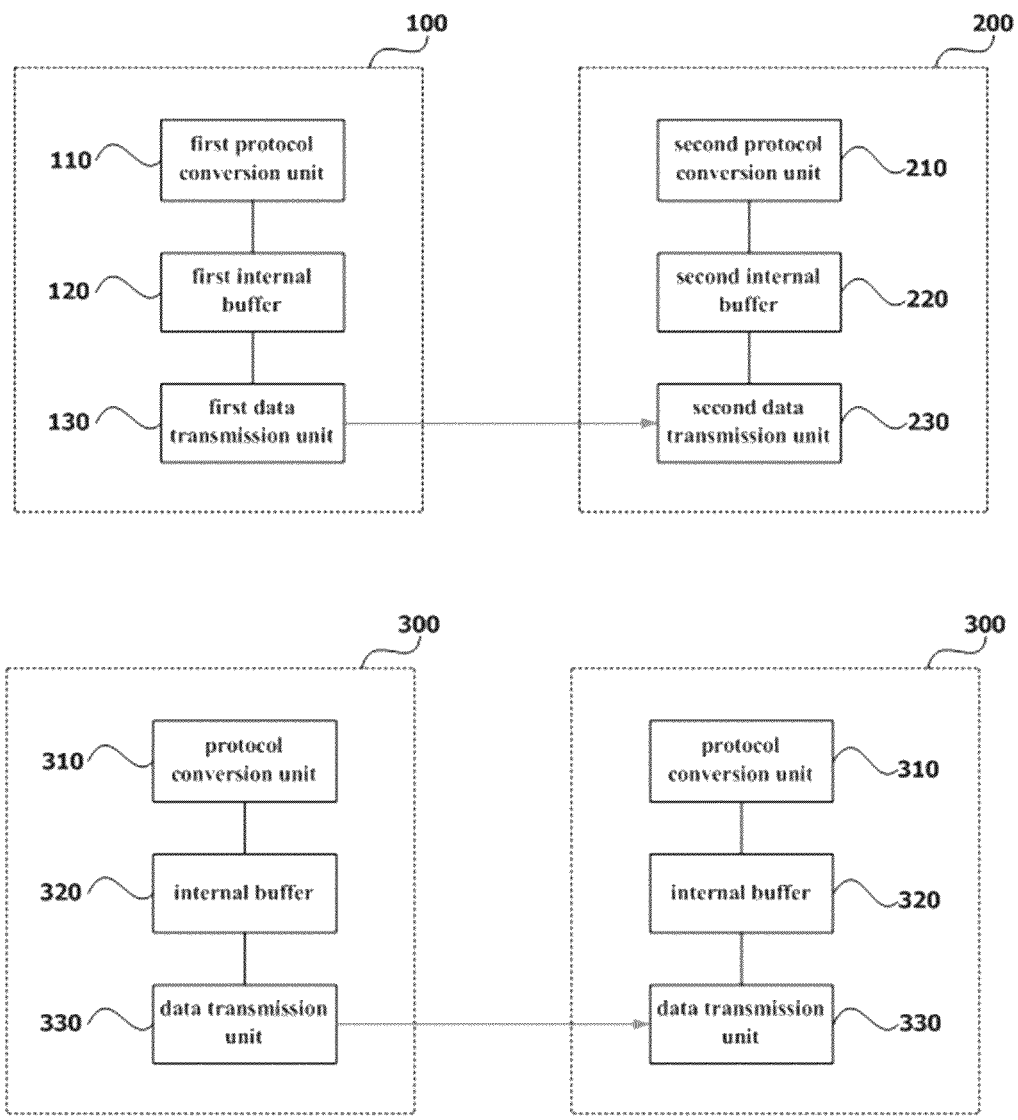
FIG. 3 is a block diagram illustrating the composition of gateways according to an embodiment of the invention.

FIG. 3 is a block diagram illustrating the composition of gateways according to an embodiment of the invention.

A first gateway 100 according to an embodiment of the invention can include a first protocol conversion unit 110, a first internal buffer 120, and a first data transmission unit 130.

Looking at each component, the first protocol conversion unit 110 can convert the data received from the EtherCAT network (hereinafter referred to as "first data") by a protocol conversion into data that is suitable for the wireless network (hereinafter referred to as "second data").

Here, the first protocol conversion unit 110 can fragment the data of the EtherCAT network to resolve problems resulting from the difference in data frame sizes between different networks.

The first internal buffer 120 can temporarily store the first data or second data to reduce the difference in communication speed between the EtherCAT network and the wireless network.

The second data that has been converted at the first protocol conversion unit 110 can be transmitted by the first data transmission unit 130 to the wireless network. Here, the first internal buffer 120 can be used to reduce the difference in communication speed between the EtherCAT network and the wireless network.

A second gateway 200 according to another embodiment of the invention can include a second protocol conversion unit 210, a second internal buffer 220, and a second data transmission unit 230.

Looking at each component, the second protocol conversion unit 210 can convert third data received from the wireless network to fourth data that is suitable for the wireless network.

Here, the second protocol conversion unit 210 can fragment the data of the wireless network to resolve problems resulting from the difference in data frame sizes between different networks.

The second internal buffer 220 can temporarily store the third data or fourth data to reduce the difference in communication speed between the EtherCAT network and the wireless network.

The fourth data that has been converted at the second protocol conversion unit 210 can be transmitted by the second data transmission unit 230 to the EtherCAT network. Here, the second internal buffer 220 can be used to reduce the difference in communication speed between the EtherCAT network and the wireless network.

For the sake of convenience, the gateway 100, 200 based on an embodiment of the invention was described above as including a first gateway 100 and a second gateway 200, where the first gateway 100 converts first data into second data and transmits it to the wireless network, while the second gateway 200 converts third data into fourth data and transmits it to the EtherCAT network, so that the first gateway 100 and the second gateway 200 each serve as a coupling device in the network.

However, this is merely one example, and it is also possible to have one gateway 300 perform the operations of both the first gateway 100 and the second gateway 200 to serve as a coupling device in the network.

That is, a gateway 300 based on an embodiment of the invention can include a protocol conversion unit 310, an internal buffer 320, and a data transmission unit 330, with the protocol conversion unit 310 performing the operations of both the first protocol conversion unit 110 and the second protocol conversion unit 210, and with the data transmission unit 330 performing the operations of both the first data transmission unit 130 and the second data transmission unit 230, where multiple gateways 300 can serve as coupling devices in the network.

Figure 4:
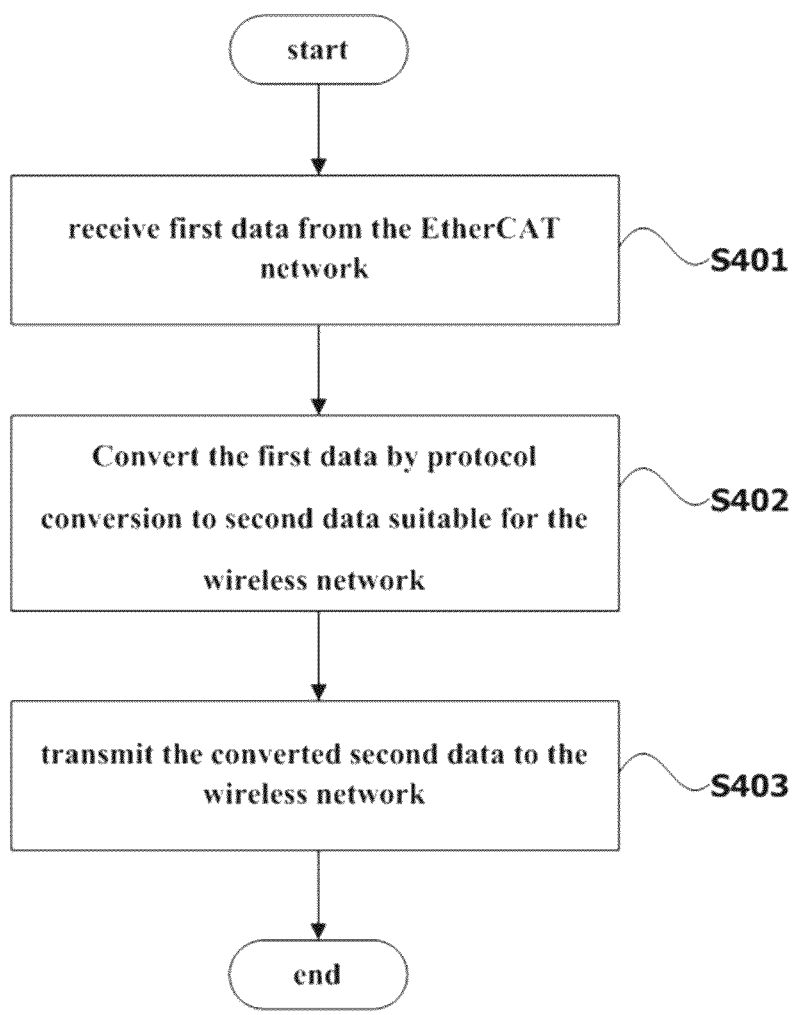
FIG. 4 is a flowchart illustrating the procedures for extending an EtherCAT network according to an embodiment of the invention.

FIG. 4 is a flowchart illustrating the procedures for extending an EtherCAT network according to an embodiment of the invention.

The description of the procedures is provided for the case in which the gateway 300 of FIG. 3 performs the procedures.

First, the gateway 300 may receive the first data from the EtherCAT network (S401).

After operation S401, the gateway 300 may convert the received first data via a protocol conversion into second data that is suitable for the wireless network (S402).

Here, the gateway 300 can fragment the first data and thus resolve problems resulting from the difference in data frame sizes between different networks.

After operation S402, the gateway 300 may transmit the converted second data to the wireless network (S403).

Here, the gateway 300 can reduce the difference in communication speed between the EtherCAT network and the wireless network by using an internal buffer.

The description of the present invention provided above is for illustrative purposes, and those having ordinary skill in the field of art to which the present invention pertains would understand that numerous variations can be easily implemented in different specific forms without departing from the technical spirit or the essential characteristics of the present invention.

Therefore, the embodiments of the invention disclosed above are for illustrative purposes in all aspects and do not limit the invention to certain forms.

For example, a component referred to in the singular can in practice be implemented in a dispersed form, and likewise components referred to as separate parts can in practice be implemented in an integrated form.

The scope of the invention is to be defined by the scope of the appended claims. The meaning and scope of the claims as well as all modifications and variations derived from their equivalents are encompassed in the scope of the present invention.

The invention claimed is:

1. A method by which a gateway extends an EtherCAT network to a wireless network, the method comprising:
    converting first data by a protocol conversion to second data suitable for the wireless network, the first data received from the EtherCAT network; and
    transmitting the converted second data to the wireless network,
    wherein the transmitting of the converted second data comprises reducing a difference in communication speed between the EtherCAT network and the wireless network by using an internal buffer.

2. The method of claim 1, wherein the converting of the first data to the second data comprises fragmenting the first data.

3. The method of claim 1, further comprising:
    converting third data by a protocol conversion to fourth data suitable for the EtherCAT network, the third data received from the wireless network; and
    transmitting the converted fourth data to the EtherCAT network,
    wherein the transmitting of the converted fourth data comprises reducing a difference in communication speed between the EtherCAT network and the wireless network by using an internal buffer.

4. A gateway for extending an EtherCAT network to a wireless network, the gateway comprising:
    a protocol conversion unit configured to convert first data by a protocol conversion to second data suitable for the wireless network, the first data received from the EtherCAT network; and
    a data transmission unit configured to transmit the converted second data to the wireless network,
    wherein the data transmission unit reduces a difference in communication speed between the EtherCAT network and the wireless network by using an internal buffer.

5. The gateway of claim 4, wherein the protocol conversion unit converts the first data to the second data by fragmenting the first data.

6. The gateway of claim 4, wherein the protocol conversion unit converts third data by a protocol conversion to fourth data suitable for the EtherCAT network, the third data received from the wireless network, and
    the data transmission unit transmits the converted fourth data to the EtherCAT network.

* * * * *